United States Patent
Jimenez (10) Patent No.: US 8,150,748 B1
(45) Date of Patent: Apr. 3, 2012

(54) SYSTEMS AND METHODS FOR DYNAMIC CONFIGURATION OF SOFTWARE AGENTS FOR TRANSFER OPERATIONS

(75) Inventor: Marco A. Jimenez, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 343 days.

(21) Appl. No.: 11/463,583

(22) Filed: Aug. 9, 2006

(51) Int. Cl.
*G06Q 40/00* (2006.01)

(52) U.S. Cl. ............... 705/35; 705/31; 705/39; 705/64; 705/401; 455/558

(58) Field of Classification Search .................. 705/31, 705/35, 39, 64, 401; 455/558
See application file for complete search history.

(56) References Cited

U.S. PATENT DOCUMENTS

| | | | |
|---|---|---|---|
| 2003/0080185 A1 | 5/2003 | Werther | |
| 2003/0105688 A1* | 6/2003 | Brown et al. | 705/31 |
| 2003/0163431 A1* | 8/2003 | Ginter et al. | 705/64 |
| 2004/0098354 A1* | 5/2004 | Manduley | 705/401 |
| 2005/0097017 A1* | 5/2005 | Hanratty | 705/35 |
| 2005/0149436 A1* | 7/2005 | Elterich | 705/39 |
| 2005/0149437 A1* | 7/2005 | Zellner et al. | 705/39 |
| 2005/0164739 A1* | 7/2005 | Goldberg et al. | 455/558 |

FOREIGN PATENT DOCUMENTS

| | | | |
|---|---|---|---|
| WO | WO 03/040877 | * | 5/2003 |
| WO | WO 03004877 A2 | * | 5/2003 |

OTHER PUBLICATIONS

"Robust Java Language" © 1997 published by Sun Microsystems, Two (2) pages.*
"Managing Transactions in a Distributed Environment", 15 pages, by Borland Staff, printed on Aug. 9, 2006; originally filed by the Applicant.*
"About PayQuik", http://www.payquick.com/aboutpayquik.php, (Aug. 9, 2006),2 p.
"Envision Financial Systems Partners with Chesapeake System Solutions to Offer PACash Automated Cash Reconciliation and Money Movement System", http://www.enfs.com/ENFS_partnerswithPACash_release.html, press release,(Jul. 13, 2006),3 p.
"Fully Integrated Back Office Process", http://www.trema.com/solutions/fi/banks/bop/, (Aug. 9, 2006),1 p.
"Managing Transactions in a Distributed Environment", http://bdn.borland.com/article/26388, (Dec. 4, 2000),15 p.
"Technology FAQ", http://www.newgenpay.com/e-payment-technologv-faq.html. (Aug. 9, 2006),2 p.

* cited by examiner

*Primary Examiner* — Mary Cheung
*Assistant Examiner* — Sanjeev Malhotra
(74) *Attorney, Agent, or Firm* — Brooks, Cameron & Huebsch, PLLC (57) ABSTRACT

Systems and methods for providing the dynamic configuration of software agents for transfer operations are described. The apparatus may include a transaction processor to receive and execute transfer requests, an object execution engine to retrieve one or more software objects and a data store to store the one or more software objects. The method may include receiving a transfer transaction request, retrieving a software object, executing the software object, performing a transfer and terminating the software object.

16 Claims, 7 Drawing Sheets

SYSTEMS AND METHODS FOR DYNAMIC CONFIGURATION OF SOFTWARE AGENTS FOR TRANSFER OPERATIONS

RELATED APPLICATIONS

This disclosure is related to pending U.S. patent application Ser. No. 11/463,584, titled "SYSTEMS AND METHODS FOR DYNAMIC CONFIGURATION OF SOFTWARE AGENTS FOR TRANSFER OPERATIONS," and U.S. patent application Ser. No. 11/463,585, titled "SYSTEMS AND METHODS FOR DYNAMIC CONFIGURATION OF SOFTWARE AGENTS FOR TRANSFER OPERATIONS," filed on an even date herewith.

TECHNICAL FIELD

This application relates to systems and methods for configuration of software agents and more particularly to the dynamic configuration of software agents for transfer operations.

BACKGROUND

Customers demand more of the products and services they use than ever before. They insist that the companies they deal with on a regular basis provide them greater and greater levels of convenience. One specific example of this increasing convenience is the use of automated and remote systems for the purposes of paying bills.

Customers desiring to avoid the hassle with purchasing stamps and writing physical checks for the number of bills they get on a regular basis have welcomed the adoption of bill pay services by the financial institutions they do business at. However, the bill pay systems may be constrained by one of two factors. The first being the awareness that multiple systems need to be accessed to enable money to be transferred from one system to another.

Two systems are in place that standardize the act of transferring money from one system, Automated Clearing House (ACH) and wire transfers. ACH transactions are simply, though not exactly, described as electronic checks in that they are processed like a check without the physical writing of a check. Wire transfers are generally known from their use in movies and television shows where a large sum of money is transferred from one bank to another while the villain waits patiently for the confirmation of the transfer. The first uses the Federal Reserve Bank, as a physical check does, for the clearing of the funds to cover the transaction. The latter uses a robust system of error-checking and recovery to ensure that the money is transferred properly. However, either one of these systems require interaction with many disparate systems. This problem is also present when all the systems are owned and operated by the same entity because of continuous upgrades and deployment of systems.

SUMMARY

In an embodiment, an apparatus for dynamically configuring and executing a transfer operation comprises a transaction processor to receive and execute transfer requests, an object execution engine to retrieve one or more software objects and a data store to store the one or more software objects. In another embodiment, a method to dynamically provide a customized software object comprises receiving a transfer transaction request, retrieving one of a plurality of software objects, executing the software object, performing a transfer and terminating the software object. In a further embodiment, a system for dynamically configuring funds transfers between disparate systems comprises a user access system to send a funds transfer request, a transfer engine to receive the funds transfer request and execute a software object to carry out the funds transfer request and an object data store to store a plurality of software objects.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following detailed description of example embodiments, reference is made to the accompanying drawings, which form a part hereof, and in which is shown, by way of illustration, specific embodiments in which the example method, apparatus, and system may be practiced. It is to be understood that other embodiments may be utilized and structural changes may be made without departing from the scope of this description.

Figure 1:
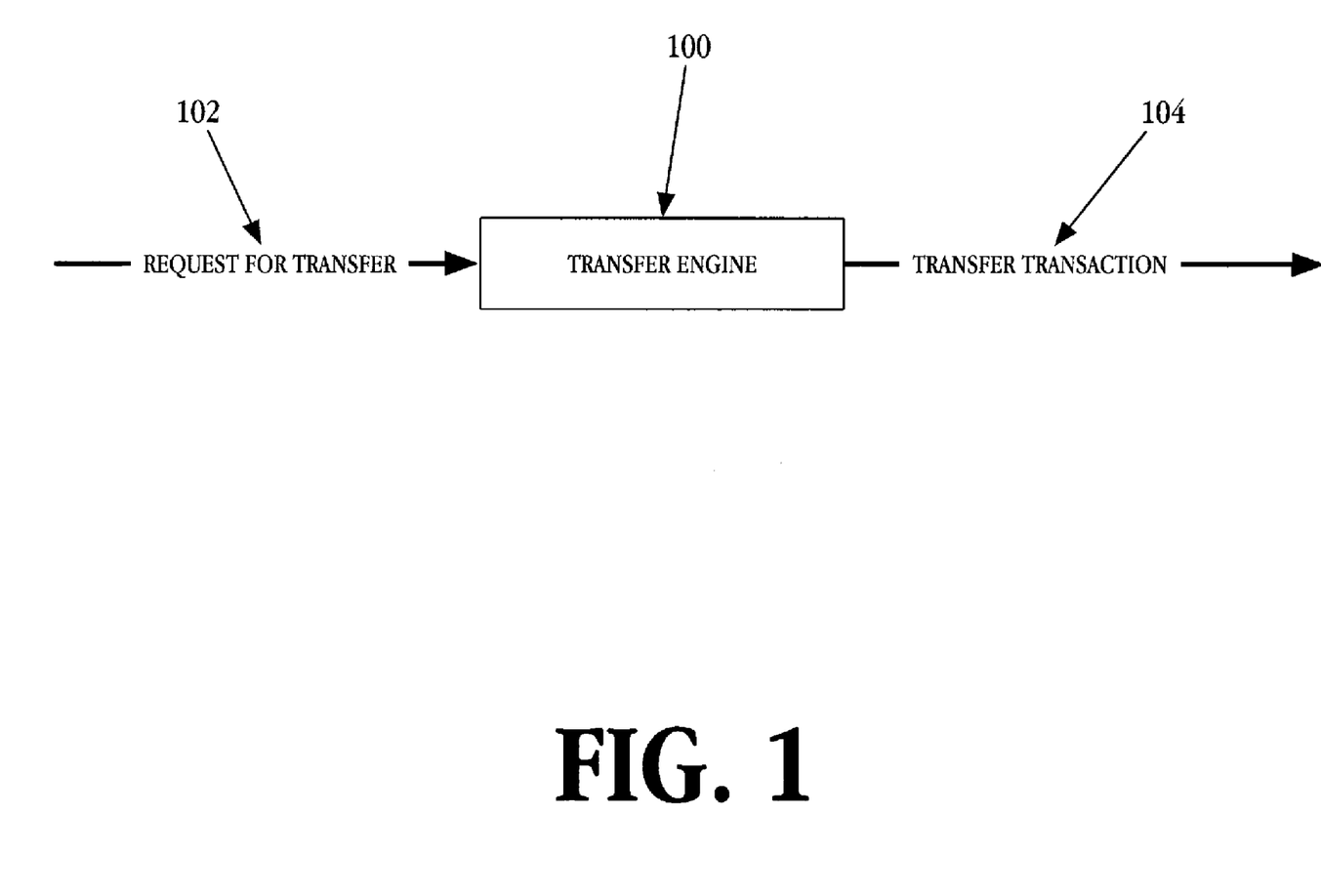
FIG. 1 shows a high level block diagram of an apparatus for executing a funds transfer, in accordance with an example embodiment.

FIG. 1 shows a high level block diagram of an apparatus for executing a funds transfer, in accordance with an example embodiment. In an embodiment, a transfer engine 100 receives a request for transfer 102 as an input, performs various operations as described herein, and outputs a transfer transaction 104. The request for transfer may include, without limitation, a funds transfer request. The request for transfer 102 may be received through any suitable manner, such as a web interface provided to customers. In an alternate implementation, an automated system could periodically order funds transfers and send the request for transfer 102 to the transfer engine 100 for execution.

In an embodiment, the request for transfer 102 defines an Automated Clearing House (ACH) transaction. The ACH transaction is an electronic implementation of a physical check in that the ACH transaction passes through the Federal Reserve Bank at some point in the process of payment settlement. In one embodiment, the request for transfer 102 is an ACH transaction request. The transfer engine 100 receives the ACH transaction, in this example, and outputs the transfer transaction 104 which are instructions intended to cause another system to execute the ACH transaction.

In an alternate embodiment, the request for transfer 102 is a wire transfer request. The wire transfer request is a direct transaction between two financial institutions for the purposes of funds withdrawal from a first account and funds deposit into a second account. In an embodiment, the request for transfer 102 is a wire transfer request. The transfer engine receives the wire transfer request, in this example, and outputs the transfer transaction 104 which are instructions intended to cause two other systems to execute a wire transfer from one account to another account.

Figure 2A:
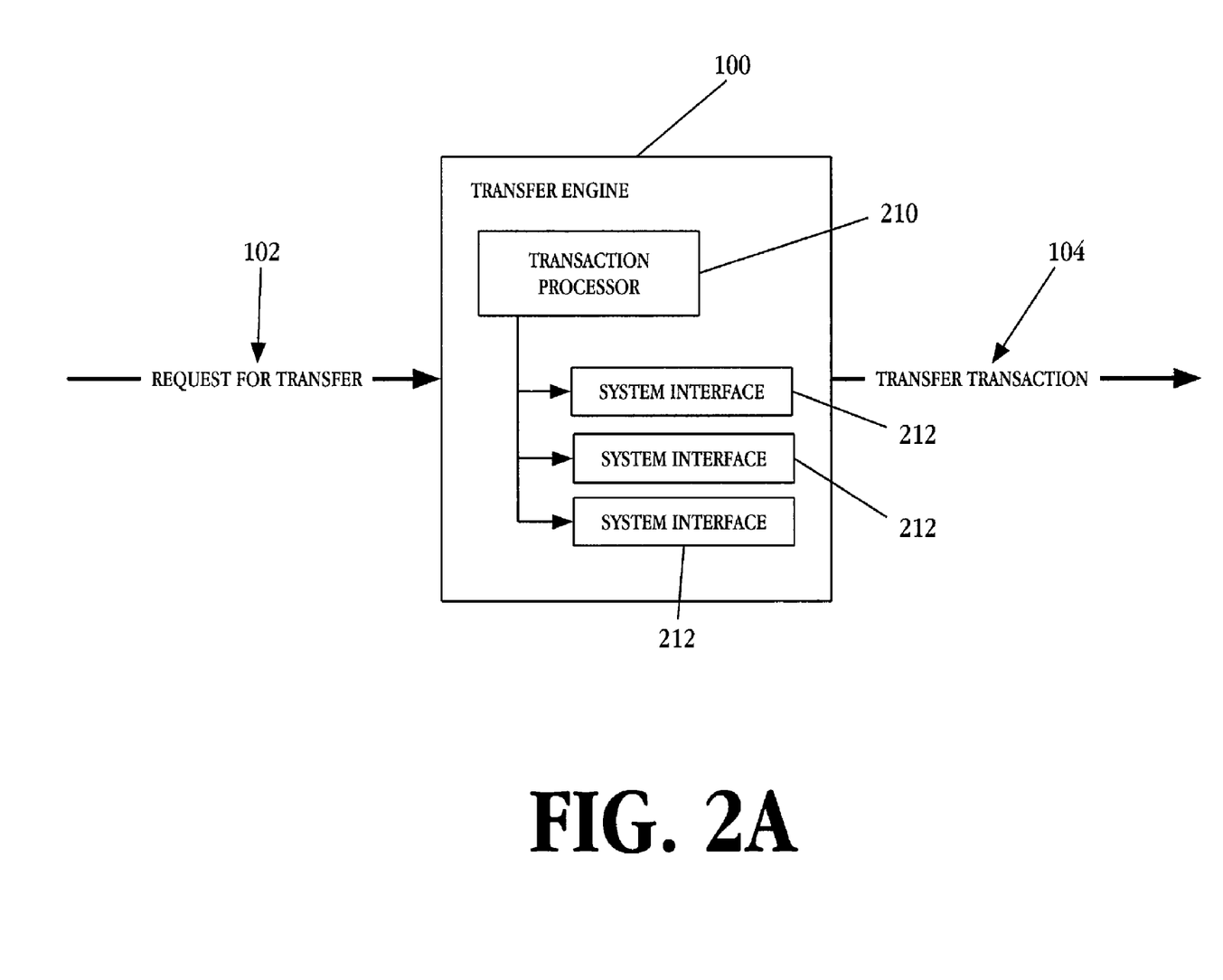
FIG. 2A shows a high-level block diagram of apparatus for executing a funds transfer, in accordance with an example embodiment.

FIG. 2A shows a high-level block diagram of apparatus for executing a funds transfer, in accordance with an example embodiment. In an embodiment, the transfer engine 100 includes a transaction processor 210 and a plurality of system interfaces 212. The request for transfer 102 received by the transfer engine 100 is passed to the transaction processor 212, in one example.

In an embodiment, the transaction processor 210 is configured to receive and execute a request for transfer 102. The transaction processor, in a further embodiment, determines one or more systems associated with the request for transfer 102. As discussed above, a funds transfer may include either an ACH transaction or a wire transfer transaction. The one or more systems associated with the request for transfer 102 may be determined by the routing number of the accounts contained within the request for transfer 102. The routing number defines the entity managing the account, which can then be used to determine the system being used by the entity. In some instances, the entity may operate many financial accounting systems. In such an arrangement, the routing number contained within the account number can define which of the accounting systems used for that particular request for transfer 102.

In the former, a single system is associated with the transfer as the ACH transaction is configured and sent to the system configured to perform the transaction. This may include an aggregate ACH transaction engine, in some examples, where any request for transfer 102 received by the transaction processor 210 is sent to that ACH transaction engine through a specific system interface 212. Alternately, the transfer engine 100 may be configured to interface directly with the financial institution managing the account from which funds will be withdrawn in accordance with the ACH transaction. Alternately, the transfer engine 100 may be configured to process more then one ACH transaction concurrently. Such an arrangement may be advantageous in situations where a financial transaction requires multiple payment sources. One example of such a situation is a large transaction where the customer can not provide all of the funds from a single account. In that situation, multiple accounts, and multiple systems, would be referenced in the request for transfer 102 and processed by the transaction processor 210.

In the latter, two or more systems are associated with the transfer, a sending (or debiting account), and a receiving (or depositing account). The difference between a wire transfer and an ACH transaction, as described above, is that in the latter the Federal Reserve Bank is used, guaranteeing the transaction for the entity presenting the ACH transaction for payment, just as in the use of a check to pay for a purchase. In the former, the wire transfer is between one financial institution and another financial institution (in a typical example, though other entities may use wire transfers as well), without the interposition of the Federal Reserve Bank. As such, error checking becomes an important consideration for wire transfers, requiring dynamic interaction with all systems affected by the transfer.

In either of the above examples, the transaction processor 210 accesses the system or systems associated with the request for transfer 102 through one or more of the plurality of system interfaces 212. Each of the plurality of system interfaces 212 is pre-configured to provide an abstracted interface to a system maintaining a financial account. The system may include, without limitation the aggregate ACH transaction engine mentioned above, a financial system maintained by the same entity that operates the transfer engine 100, a financial system maintained by an entity other then the entity that operates the transfer engine 100, or any financial system capable of receiving or withdrawing funds. In the example of ACH transactions, the system may be configured to issue an ACH request. In the example of wire transfer transactions, the systems maintaining the debiting account and the depositing account have abstracted interfaces provided that the transfer engine 100 can use to complete a portion of the transaction.

However, each of the system interfaces 212 is pre-configured to access a specific system for the purposes of transfer transactions 104. When a new system, internal or external, is needed to enable expanded funds transfer functionality, a new system interface is required to be programmed and stored within the transfer engine 100. This creates a delay in adding functionality to the customers as the software code associated with the new system interface would represent an update to the code of the transfer engine 100, requiring a software update to the transfer engine 100, which may in turn cause system downtime.

Figure 2B:
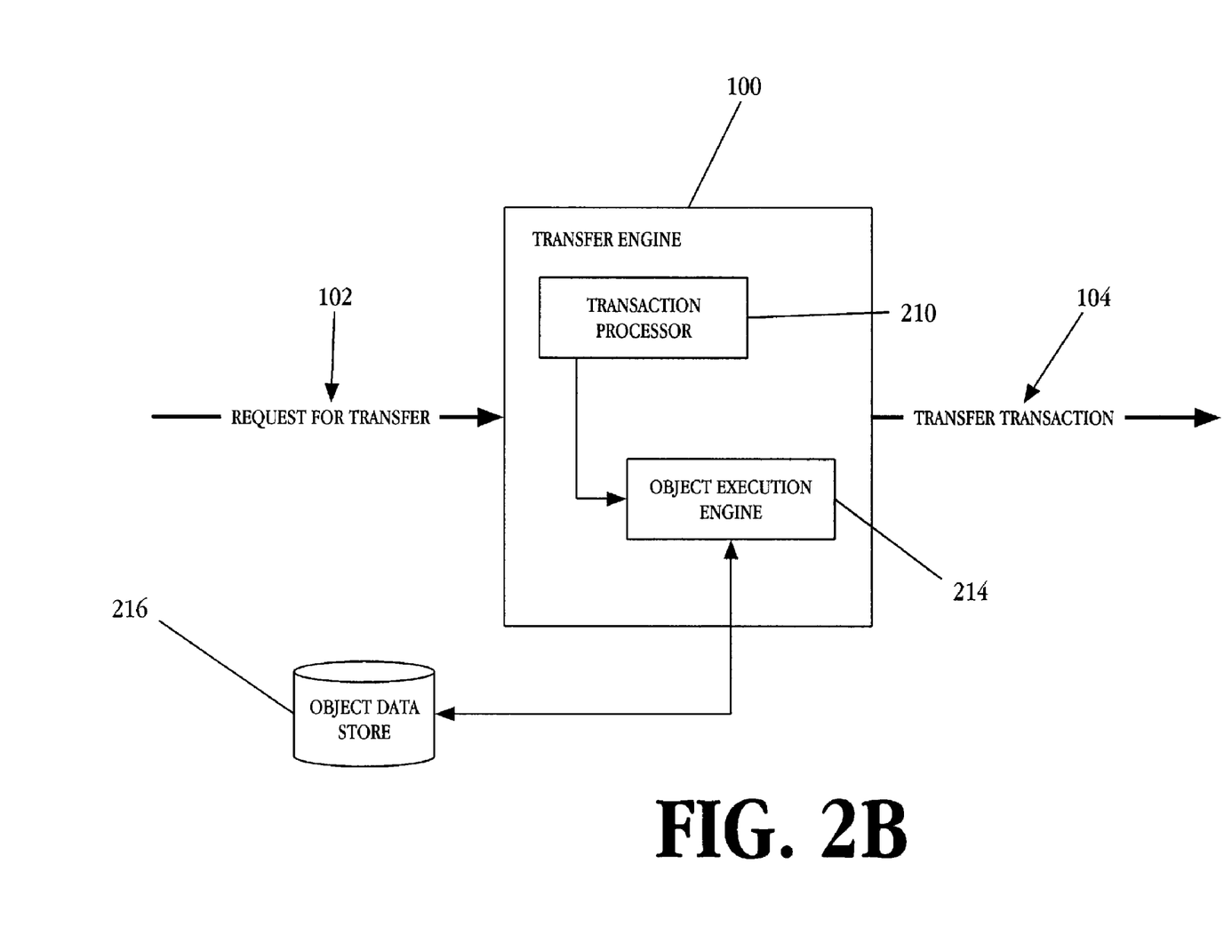
FIG. 2B shows a more detailed block diagram for executing a funds transfer, accordance with an example embodiment.

FIG. 2B shows a more detailed block diagram for executing a funds transfer, in accordance with an example embodiment. The apparatus depicted in FIG. 2B is similar to the apparatus depicted in FIG. 2A with the addition of an object execution engine 214 coupled to an object data store 216. As described above, the addition of a new system interface requires an update to the transfer engine. The object execution engine 214, a sub-module of the transfer engine 100, removes the requirement that the transfer engine 100 be updated.

In an embodiment, the object execution engine 214 is coupled to the transaction processor and is configured to retrieve one or more software objects from the object data store 216 using, at least, the systems associated with the request for transfer as determined by the transaction processor 210. The object execution engine 214 is further configured to execute the software object, which is then used as an interface to the system associated with the request for transfer 100. The object data store 216 stores a plurality of software objects, each of which is configured to provide an abstracted interface to a system external to the transfer engine for the purposes of funds transfer. Through such an arrangement, the transaction processor 210 is able to provide minimal information in order to carry out the request for transfer 100. The information required may be nothing more than identification of the external system(s) associated with the request, type of transfer(s), and amount of transfer(s). In the example depicted above in FIG. 2A, much more information would be required to be parsed out, including the memory location of the exact system interface to invoke to carry out the transfer.

Each of the software objects stored in the object data store 216 and called by the object execution engine 214 is configured to provide an abstracted interface to an external system. Through this mechanism, the software object, once executed, translates commands received from the transaction processor into instructions executable by the external system. The transaction processor 210 and the transfer engine 100, can communicate to the software objects executed by the object execution engine 214 using a standard set of commands and messages that need not be modified when additional external systems are accessed, or existing external systems are modified. In such situations, the only modification required is the addition of software objects to an object data store 216 or modification of software objects stored by the object data store 216. In one embodiment, the software objects are Java 2 Enterprise Edition (J2EE) software objects. In alternate embodiments, the software objects are programmed in any suitable rapid development language.

In a further embodiment, at least one of the software objects stored by the object data store 216 is a robust software object. A robust software object, in the context of the present discussion is a software object that is configured to call other software objects for execution. One example of the need for more then one software object to be called for execution and operation is in the case of a wire transfer where interaction with two separate systems is needed to carry out the transfer. In such an arrangement, a robust software object is first selected by the transaction processor 210 for retrieval by the object execution engine 214. The robust software object then selects additional software objects for retrieval and execution, and maintaining communications with and between the additional software objects once executed. Such an arrangement provides for error checking and recovery during a wire transfer transaction. Contrasting this is an ACH transaction, which may require multiple software objects to be executed, but no communication between then is needed to carry out the actual transaction.

The apparatus and systems described above with respect to FIGS. 1, 2A and 2B may be implemented in hardware, software, firmware, or any combination thereof. Although depicted as separate modules in FIG. 1, 2A and 2B, the functionality described above with respect to each of the modules or engines may be combined with other modules or engines without departing from the scope of the present application.

Figure 3A:
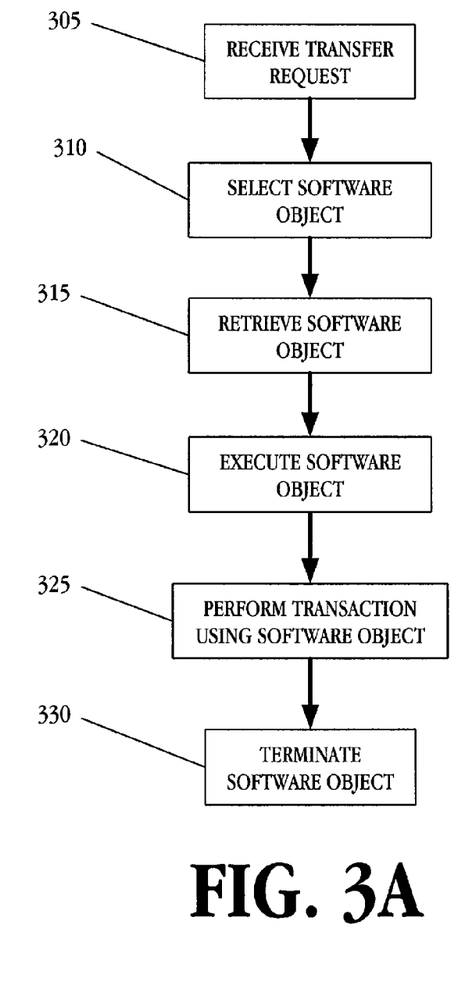
FIG. 3A shows a flowchart of a method for executing a funds transfer, in accordance with an example embodiment.

FIG. 3A shows a flowchart of a method for executing a funds transfer, in accordance with an example embodiment. The method depicted in FIG. 3A may be carried out on an apparatus similar to that depicted in FIG. 2A and described above, in one example.

At block 305 a transfer request is received by a transfer engine 100. At block 310, the transaction processor 210 of the transfer engine 100 selects one or more software objects, the selection based at least in part on the system associated with the transfer request received at block 305. The one or more software objects selected at block 310 are retrieved from an object data store 216 by an object execution engine 214 at block 315. The object execution engine 214 executes the retrieved one or more software objects at block 320. The transfer engine 100 can then use the executed one or more software objects to perform the transaction at block 325 required by the transfer request. Once the transaction is completed, the software object is terminated at block 330.

In one embodiment, the software object executed at block 320 is an instance of the software object stored in the object data store 216. In such an arrangement, a second transaction using the method depicted in FIG. 3A can be performed using the same software object.

Figure 3B:
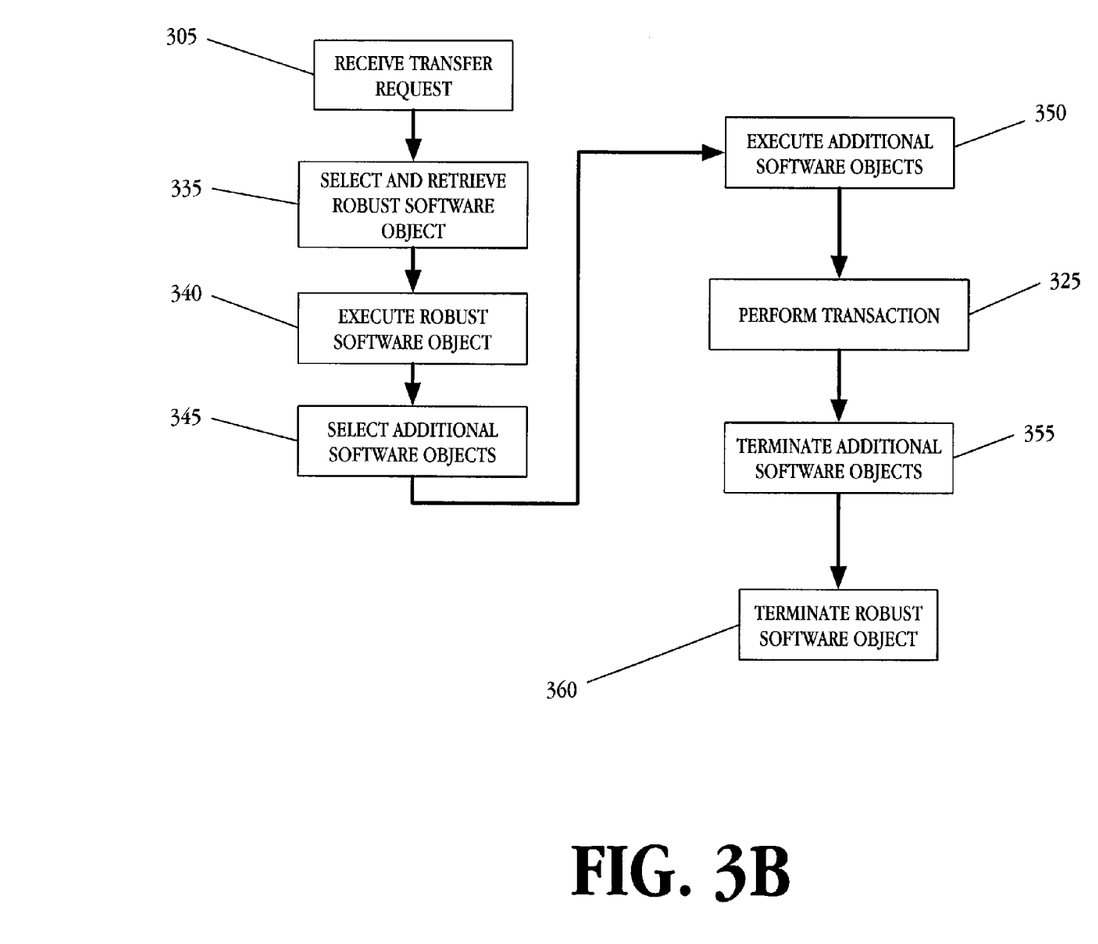
FIG. 3B shows a flowchart of a method for executing a funds transfer, in accordance with an example embodiment.

FIG. 3B shows a flowchart of a method for executing a funds transfer, in accordance with an example embodiment. The method depicted in FIG. 3B may be carried out on an apparatus similar to that depicted in FIG. 2A and described above, in one example. The method depicted in FIG. 3B is similar to the method depicted in FIG. 3A in that a transfer request is received by the transfer engine 100 at block 305 and performed at block 325. However, as discussed above, the software object selected at block 310 may be a robust software object capable of causing additional software objects to be retrieved by the object execution engine 214.

At block 335, a robust software object is selected and then retrieved from the object data store 216. The robust software object is executed at block 340. Upon execution, the robust software object receiving the transfer request from the transaction processor selects additional software objects to be retrieved by the object execution engine 214 at block 345. The additional software objects are executed by the object execution engine 214 at block 350. The additional software objects can then interact with the external systems and the robust software object to carry out the transaction requested at block 305. In this arrangement, the robust software object controls the additional software objects. Once the transaction is performed at block 325 and completed, the robust software object issues commands to the object execution engine 214 to terminate the additional software objects at block 355. The object execution engine 214 then terminates the robust software object at block 360.

Figure 4:
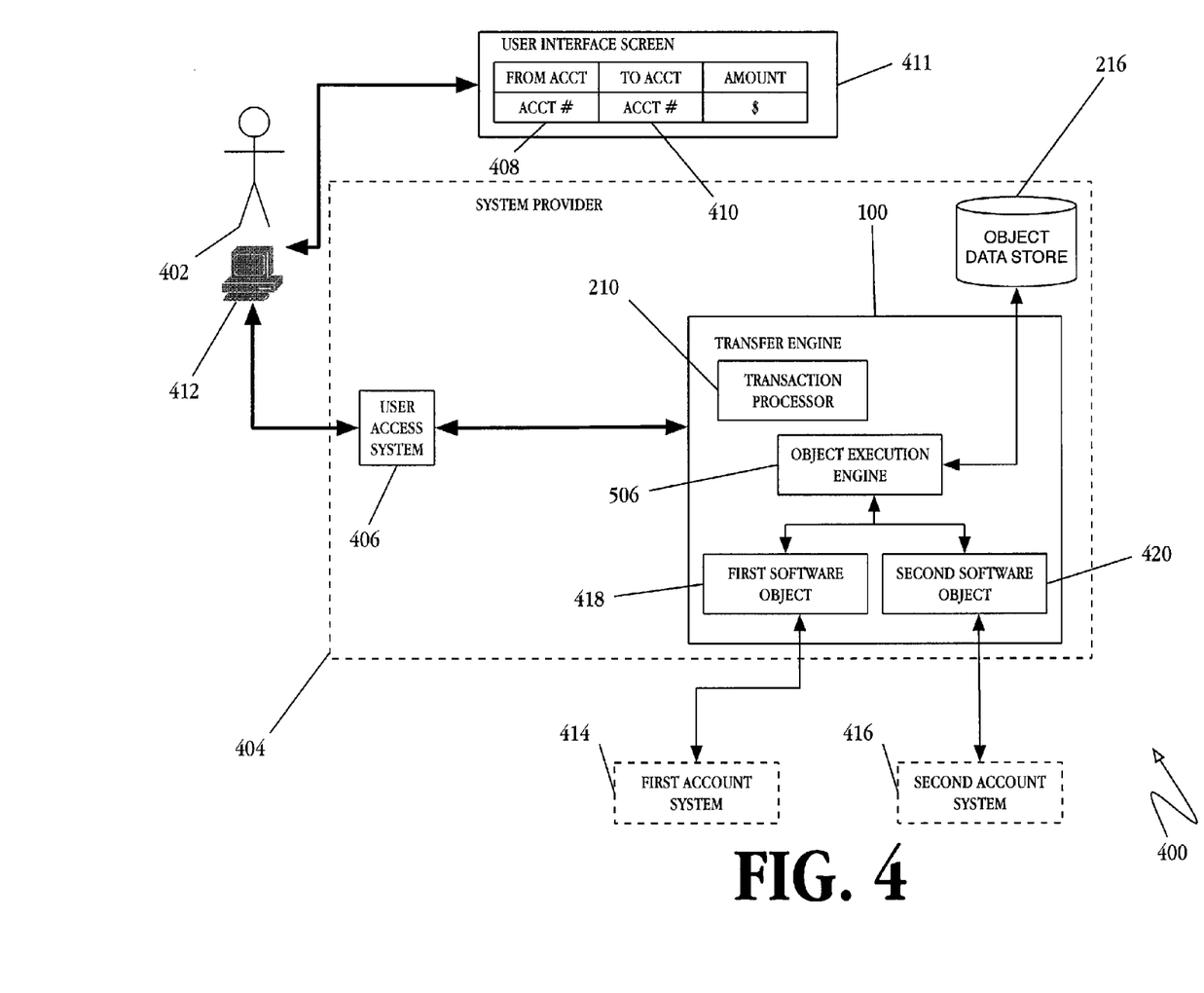
FIG. 4 shows a block diagram of a system that provides for the execution of a funds transfer request, in accordance with an example embodiment.

FIG. 4 shows a block diagram of a system that provides for the execution of a funds transfer request, in accordance with an example embodiment. The system 400 of FIG. 4 is an example implementation of the apparatus and methods described above. The system 400 includes a customer 402 interacting with a system provider 404, through a user access system 406, providing financial accounts and services to the customer 402. One of the services the provider 404 may make available is the ability to attend to financial obligations of the customer 402. The customer 402, through interaction with the user access system 406, can define accounts from which to withdraw money and accounts to which those withdrawn monies can be deposited.

The customer 402 through interaction with the user access system 406 selects a from account 408, a to account 410, and an amount, through any suitable user interface, such as a web browser screen 411 displayed on their computing device 412. The web browser screen 411 may be formatted by the user access system 406 and sent to the computing device 412 of the customer 402, in one example. The use access system 402 receives a transfer request from the customer 402 and sends the transfer request to the transfer engine 100. The transfer engine 100 passes the transfer request to the transaction processor 210, which determines, using the routing numbers for the from account and the to account, which systems are associated with the transfer request. In this example, the first system 414 is the system maintaining the to account 410 and the second system 416 is the system maintaining the from account 408. As discussed above, the transfer request may define either a wire transfer transaction or an ACH transaction. Using this example, both types of transactions will be discussed further.

For an ACH transaction, only the to account 410 and the first system 414 are needed by the transaction processor 210 to carry out the transaction. The transaction processor 210 determines the first system 414 based on the routing number contained within the to account 410 and selects a first account system software object 418 from the object data store 216. The first account system software object 418 is retrieved by the object execution engine 214 and executed. The details of the transfer are passed to the first account system software object 418, which then formats software instructions executable by the first system 414. The instructions are transmitted through any suitable means to the first system 414, which then processes the ACH transaction. Actual methods of processing an ACH transaction to obtain settlement of funds are well known and discussion of them are considered to be outside the scope of the present discussion as any suitable method of processing the ACH transaction by the first system 414 may be used.

As discussed above, multiple ACH transaction may be required to carry out a transfer request. However, each of those ACH transaction can occur independently of all others as no information is required to be passed from the first system 414 to the second system 416 in order to carry out the transaction. In such an arrangement, a first account system software object 418 is retrieved and executed and then used to carry out an ACH transaction with the first system 414 and a second account system software object 420 is retrieved and executed and then used to carry out an ACH transaction with the second system 416. These may occur concurrently or in series, as their operations are independent of each other in the context of an ACH transaction.

For a wire transfer transaction, a robust software object (not shown in FIG. 4) is first retrieved and executed. The robust software object sends instructions to the object execution engine 214 intended to cause the object execution engine 214 to retrieve two or more software objects. In this example, a first account system software object 418 and a second account system software object 420 are retrieved from the object data store 216 and executed by the object execution engine 214. The robust software object, through the account system software objects 418 and 420, accesses the first system 414 and the second system 416 for the purposes of transmitting instructions intended to cause a withdrawal of funds from the second system 416 and a deposit of those funds to the first system 414. The deposit may be less then the withdrawal, in some examples, in order to cover the transactional costs of the wire transfer.

The first account system software object 418 provides an abstracted interface to the first account system 414 for the robust software object and receives instructions from the robust software object and translates those instructions into code executable by the first account system 414 for the purposes of carrying out the wire transfer, in this example. The same operations and abstraction for the second account system 416 are provided for by the second account system software object 410, in this example. As the operations proceed to execute the wire transfer, messages may need to be passed from one system to the other for the purposes of error checking and recovery as well as confirmation of transaction completion. The robust software object is configured to receive these messages and appropriately request status messages from the systems, in addition to send messages to the systems to carry out those functions. Once the transaction is confirmed complete, the robust software object sends instructions to the object execution engine 214 to terminate the first and second account system software objects 418 and 420. The object execution engine 214 then terminates the robust software object and, through the transaction processor 210, sends a message to the user access system 406 regarding the transaction, which can then be displayed to the customer 402 through any suitable means.

Figure 5:
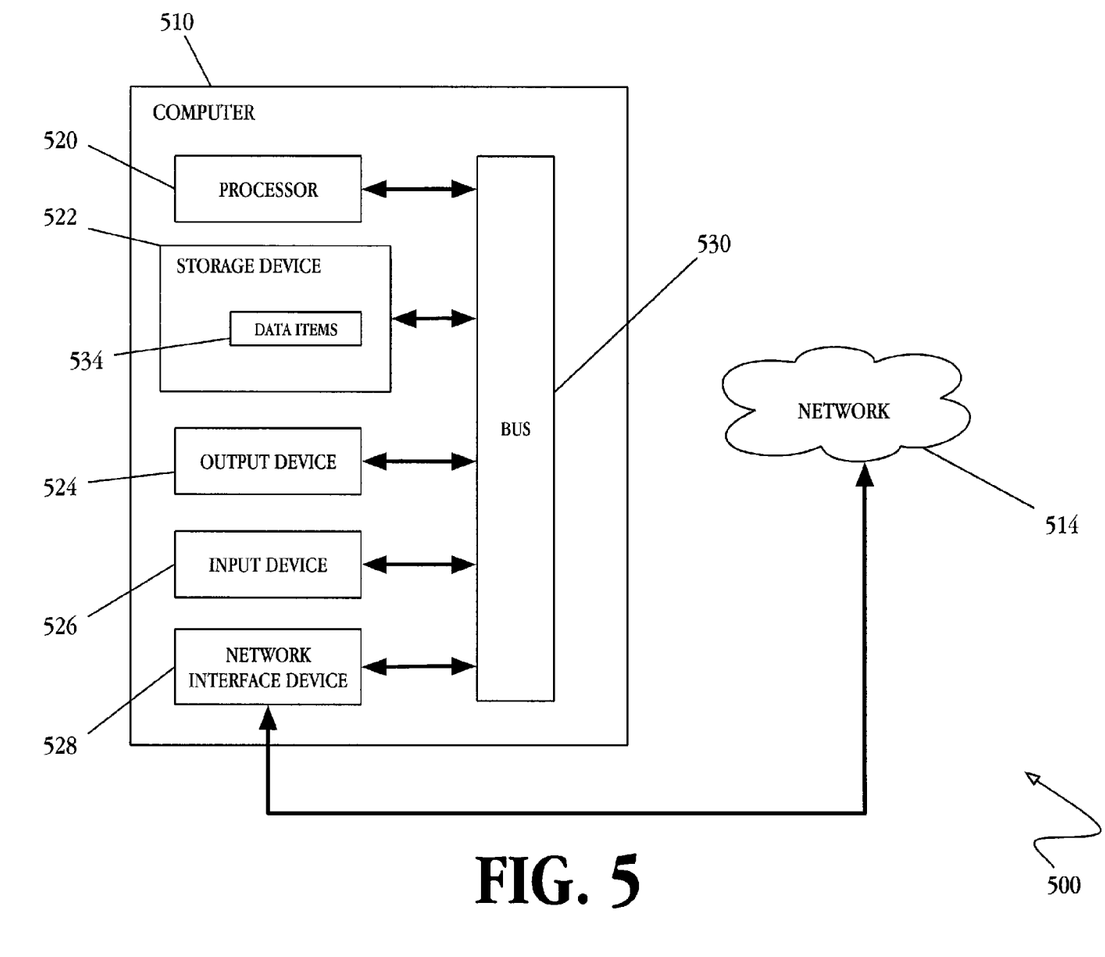
FIG. 5 shows a block diagram of a machine including instructions to perform any one or more of the methodologies described herein.

FIG. 5 shows a block diagram of a machine including instructions to perform any one or more of the methodologies described herein. A system 500 includes a computer 510 connected to a network 514. The computer 510 includes a processor 520, a storage device 522, an output device 524, an input device 526, and a network interface device 528, all connected via a bus 530. The processor 520 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 520 executes instructions and includes that portion of the computer 510 that controls the operation of the entire computer. Although not depicted in FIG. 5, the processor 520 typically includes a control unit that organizes data and program storage in memory and transfers data and other information between the various parts of the computer 510. The processor 520 receives input data from the input device 525 and the network 514, reads and stores code and data in the storage device 522, and presents data to the output device 524.

Although the computer 510 is shown to contain only a single processor 520 and a single bus 530, the disclosed embodiment applies equally to computers that may have multiple processors, and to computers that may have multiple busses with some or all performing different functions in different ways.

The storage device 522 represents one or more mechanisms for storing data. For example, the storage device 522 may include read only memory (ROM), random access memory (RAM), magnetic disk storage media, optical storage media, flash memory devices, and/or other machine-readable media. In other embodiments, any appropriate type of storage device may be used. Although only one storage device 522 is shown, multiple storage devices and multiple types of storage devices may be present. Further, although the computer 510 is drawn to contain the storage device 522, it may be distributed across other computers, for example on a server.

The storage device 522 includes a controller (not shown in FIG. 5) and data items 534. The controller includes instructions capable of being executed on the processor 520 to carry out the functions, as previously described above with reference to FIGS. 1-4. In another embodiment, some or all of the functions are carried out via hardware in lieu of a processor-based system. In one embodiment, the controller is a web browser, but in other embodiments, the controller may be a database system, a file system, an electronic mail system, a media manager, an image manager, or may include any other functions capable of accessing data items. Of course, the storage device 522 may also contain additional software and data (not shown), which is not necessary to understanding the invention.

Although the controller and the data items 534 are shown to be within the storage device 522 in the computer 510, some or all of them may be distributed across other systems, for example on a server and accessed via the network 514.

The output device 524 is that part of the computer 510 that displays output to the user. The output device 524 may be a liquid crystal display (LCD) well-known in the art of computer hardware. But, in other embodiments the output device 524 may be replaced with a gas or plasma-based flat-panel display or a traditional cathode-ray tube (CRT) display. In still other embodiments, any appropriate display device may be used. Although only one output device 524 is shown, in other embodiments any number of output devices of different types, or of the same type, may be present. In an embodiment, the output device 524 displays a user interface.

The input device 526 may be a keyboard, mouse or other pointing device, trackball, touchpad, touch screen, keypad, microphone, voice recognition device, or any other appropriate mechanism for the user to input data to the computer 510 and manipulate the user interface previously discussed. Although only one input device 526 is shown, in another embodiment any number and type of input devices may be present.

The network interface device 528 provides connectivity from the computer 510 to the network 514 through any suitable communications protocol. The network interface device 528 sends and receives data items from the network 514.

The bus 530 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 510 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of the computer 510. For example, other peripheral devices such as audio adapters or chip programming devices, such as EPROM (Erasable Programmable Read-Only Memory) programming devices may be used in addition to, or in place of, the hardware already depicted.

The network 514 may be any suitable network and may support any appropriate protocol suitable for communication to the computer 510. In an embodiment, the network 514 may support wireless communications. In another embodiment, the network 514 may support hard-wired communications, such as a telephone line or cable. In another embodiment, the network 514 may support the Ethernet IEEE (Institute of Electrical and Electronics Engineers) 802.3x specification. In another embodiment, the network 514 may be the Internet and may support IP (Internet Protocol). In another embodiment, the network 514 may be a local area network (LAN) or a wide area network (WAN). In another embodiment, the network 514 may be a hotspot service provider network. In another embodiment, the network 514 may be an intranet. In another embodiment, the network 514 may be a GPRS (General Packet Radio Service) network. In another embodiment, the network 514 may be any appropriate cellular data network or cell-based radio network technology. In another embodiment, the network 514 may be an IEEE 802.11 wireless network. In still another embodiment, the network 514 may be any suitable network or combination of networks. Although one network 514 is shown, in other embodiments any number of networks (of the same or different types) may be present.

The embodiments described herein may be implemented in an operating environment comprising software installed on any programmable device, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A machine-readable medium having machine executable instructions for providing benefits to a user contained therein, the machine-executable instructions performing the following operations:

receiving a funds transfer transaction request, the funds transfer transaction request including a plurality of payment sources, wherein funds from each payment source are used in the funds transfer transaction request;

selecting a software object from a plurality of software objects in a software object store using an external system providing the funds transfer request, wherein at least one of the plurality of software objects is a robust software object, the robust software object configured to call one or more other software objects to provide for a transfer of funds between two or more external systems and to control the additional software objects;

retrieving from a software object data store the executable software object from the plurality of software objects based on the funds transfer transaction request, the plurality of software objects configured to initiate and produce an interface with an external system for the plurality of payment sources and for a specific funds transfer request;

executing the software object retrieved from the software object data store to setup the interface with the external system;

wherein each of the plurality of software objects is an abstracted interface object configured to receive a standardized set of data items and translate the standardized set of data items into instructions intended to cause the external system to perform operations intended to complete the transfer transaction request;

performing a funds transfer defined by the funds transfer transaction request using the interface setup by the executed software object; and terminating the executed software object.

2. The machine-readable medium of claim 1, wherein the transfer transaction request is an ACH (Automated Clearing House) transaction.

3. The machine-readable medium of claim 1, wherein the transfer transaction request is a wire transfer transaction.

4. The machine-readable medium of claim 1, wherein each of the plurality of software objects is a J2EE (Java 2 Enterprise Edition) software object.

5. The machine-readable medium of claim 1, wherein the one or more other software objects are retrieved from the software object data store in response to instructions sent from the robust software object.

6. A method of dynamically providing a customized software object, the method comprising:

receiving a funds transfer transaction request, the funds transfer transaction request including a plurality & payment sources, wherein funds from each payment source are used in the funds transfer transaction request;

selecting a software object from a plurality of software objects in a software object store using an external system providing the funds transfer request, wherein at least one of the plurality of software objects is a robust software object, the robust software object configured to call one or more other software objects to provide for a transfer of funds between two or more external systems and to control the additional software objects;

retrieving, from a software object data store, the software object from the plurality of software objects using the funds transfer transaction request, the plurality of software objects being configured to initiate and produce an interface with an external system for the plurality of payment sources and for a specific funds transfer request;

executing the software object retrieved from the software object data store to produce the interface;

wherein each of the plurality of software objects is an abstracted interface object configured to receive a standardized set of data items and translate the standardized set of data items into instructions intended to cause the external system to perform operations intended to complete the transfer transaction request;

performing a transfer defined by the funds transfer transaction request using the executed software object and the interface; and terminating the executed software object.

7. The method of claim 6, wherein the transfer transaction request is an ACH transaction.

8. The method of claim 6, wherein the transfer transaction request is a wire transfer transaction.

9. The method of claim 6, wherein each of the plurality of software objects is a J2EE software object.

10. The method of claim 6, wherein the one or more other software objects are retrieved from the software object data store in response to instructions sent from the robust software object.

11. A system for dynamically providing a customized software object, the system comprising at least one subsystem for:
   receiving a funds transfer transaction request, the funds transfer transaction request including a plurality of payment sources, wherein funds from each payment source are used in the funds transfer transaction request;
   selecting a software object from a plurality of software objects in a software object store using an external system providing the funds transfer request, wherein at least one of the plurality of software objects is a robust software object, the robust software object configured to call one or more other software objects to provide for a transfer of funds between two or more external systems and to control the additional software objects;
   retrieving, from a software object data store, the software object from the plurality of software objects using the funds transfer transaction request, the plurality of software objects configured to initiate and produce an interface with an external system for the plurality of payment sources and for a specific funds transfer request;
   executing, in a processor, the software object retrieved from the software object data store to produce the interface;
   wherein each of the plurality of software objects is an abstracted interface object configured to receive a standardized set of data items and translate the standardized set of data items into instructions intended to cause the external system to perform operations intended to complete the transfer transaction request;
   performing, in a system, a transfer defined by the transfer transaction request using the executed software object and the interface; and
   terminating the executed software object.

12. The system of claim 11, wherein the transfer transaction request is an ACH transaction.

13. The system of claim 11, wherein the transfer transaction request is a wire transfer transaction.

14. The system of claim 11, wherein each of the plurality of software objects is a J2EE software object.

15. The system of claim 11, wherein the one or more other software objects are retrieved from the software object data store in response to instructions sent from the robust software object.

16. The medium of claim 1, wherein terminating includes terminating the interface; and wherein selecting includes determining if an interface for the external is running and if so skipping the retrieving and executing and proceeding to the performing funds transfer.

* * * * *